United States Patent [19]

Greenwald et al.

[11] 4,384,238
[45] May 17, 1983

[54] ELECTRONIC STROBE FLASH APPARATUS FOR INDIRECT AND DIRECT FLASH

[75] Inventors: Roger J. Greenwald, Churchville; Scott A. Brownstein, Rochester, both of N.Y.

[73] Assignee: Eastman Kodak Company, Rochester, N.Y.

[21] Appl. No.: 216,395

[22] Filed: Dec. 15, 1980

Related U.S. Application Data

[63] Continuation of Ser. No. 101,666, Dec. 10, 1979, abandoned.

[51] Int. Cl.³ .............................................. H05B 41/34
[52] U.S. Cl. .................................. 315/151; 315/154; 315/241 P; 354/132
[58] Field of Search ............ 315/151, 154, 159, 241 P, 315/313, 324; 354/33, 126, 132, 145

[56] References Cited

U.S. PATENT DOCUMENTS

| | | | |
|---|---|---|---|
| 2,622,229 | 12/1952 | Lord | 315/152 |
| 3,980,923 | 9/1976 | Schneider | 315/241 P |
| 4,078,240 | 3/1978 | Kaneko | 354/33 |
| 4,085,316 | 4/1978 | Quinn | 362/16 |
| 4,122,333 | 10/1978 | Crouse | 354/126 X |

FOREIGN PATENT DOCUMENTS

51-141938  4/1976  Japan .................................. 354/132

OTHER PUBLICATIONS

Baily, *Phototronics*, Article in Modern Photography, Oct. 1978, pp. 34, 36, 192, 194; Feb. 1980, pp. 25, 26, 28, 30.

Amateur Photographer, Feb. 7, 1979, p. 82, Advertisement for "Multi-Dimensional Electronic Flash".

Saunders, *Test Report–Starblitz 3000 BT-Twin*, Amateur Photographer, Dec. 22, 1979, pp. 84, 85.

*Primary Examiner*—Eugene R. La Roche
*Attorney, Agent, or Firm*—D. P. Monteith

[57] ABSTRACT

Electronic strobe flash apparatus includes a first energizable flashtube arranged to project light for reflection from a surface to illuminate a scene indirectly, and a second energizable flashtube arranged to illuminate the scene directly. A sequencing circuit controls the energization of both flashtubes so that the ratio of the indirect flash to the direct flash reflected from the scene is constant in instances where the reflected flash is above a minimum level. For this purpose, a light-sensitive circuit, arranged to sense light reflected from the scene, is coupled to the sequencing circuit. The sequencing circuit causes the indirect flash to be produced first. The light-sensitive circuit causes the sequencing circuit to (1) quench the first flashtube to extinguish the indirect flash, and (2) fire the second flashtube to produce the direct flash, when the light-sensitive circuit senses that a predetermined fraction of a desired total amount of light has been reflected from the scene. Then, the sequencing circuit quenches the second flashtube to extinguish the direct flash when the light-sensitive circuit has sensed the desired total amount of reflected scene light. If the light-sensitive circuit senses very little light following the energization of the first flashtube, indicating that insufficient indirect flash will be produced, the sequencing circuit quickly quenches that flashtube, thereby saving electrical energy that otherwise would be wasted. To regulate the indirect and the direct flash independently of the ambient light, a bandpass filter can be employed to remove from the light-sensitive circuit's output any contribution due to ambient light.

15 Claims, 2 Drawing Figures

ELECTRONIC STROBE FLASH APPARATUS FOR INDIRECT AND DIRECT FLASH

This is a continuation of application Ser. No. 101,666, filed Dec. 10, 1979, abandoned.

BACKGROUND OF THE INVENTION (1) Field of the Invention

This invention relates to electronic strobe flash apparatus. More particularly, this invention relates to electronic strobe flash apparatus which provides indirect and direct flash so that any predetermined ratio of indirect to direct flash is maintained.

(2) Description of the Prior Art

For a flash exposure, it is desirable to illuminate a scene indirectly so that it appears to be illuminated from above in a way characteristic of natural lighting by the sun. This indirect illumination is commonly known as bounce flash. It is also desirable to illuminate the scene directly to soften dark shadows caused by obliquely directed light. This direct illumination is commonly called fill-in flash.

Indirect flash alone can produce a photograph with harsh dark shadows. Direct flash can produce a photograph which has an unnatural appearance. If the indirect and direct flash are maintained in proper proportion to each other, a more pleasing balanced flash exposure results.

U.S. Pat. No. 4,085,316; *Modern Photography*, pg. 34, October 1978; *Amateur Photographer*, pg. 82, Feb. 7, 1979; and *Research Disclosure*, pg. 67, February 1979 describe electronic strobe flash apparatus for providing both indirect and direct flash for the same exposure.

In the flash apparatus described in the above publications, the indirect and direct flash are produced simultaneously. Without a complicated light-sensing arrangement, it is not possible to control the indirect and direct flash so that a balanced flash exposure can be produced.

SUMMARY OF THE INVENTION

In accordance with the present invention, electronic strobe flash apparatus includes a first energizable flashtube arranged to project light in a first direction to illuminate a scene with indirect flash, a second energizable flashtube arranged to project light in a second direction to illuminate the scene with direct flash, and photosensitive means arranged for sensing light reflected from the scene. The flash apparatus further includes means for energizing one of the flashtubes to illuminate the scene, and light regulating means for de-energizing the energized flashtube and for energizing the other flashtube to illuminate the scene with light produced by only one of the flashtubes at any one time.

In a preferred embodiment, the indirect flash is produced first. The light regulating means de-energizes the first flashtube to extinguish the indirect flash, and energizes the second flashtube to produce the direct flash when the photosensitive means senses that a first predetermined amount of light has been reflected from the scene. The light regulating means de-energizes the second flashtube to extinguish the direct flash when the photosensitive means senses that a second predetermined amount of light has been reflected from the scene, whereby the first and second flashtubes are controlled so that the ratio of reflected indirect flash to reflected direct flash is constant.

The light regulating means can include a low-light switch for quenching the first flashtube quickly when an inadequate amount of indirect flash will be produced, such as when illuminating an outdoor scene, to avoid wasting the electrical energy used to produce the indirect flash. Also, to regulate the indirect and the direct flash independently of the ambient light, a band-pass filter can be employed to remove from the photosensitive means output any contribution due to ambient light.

The invention, and its advantages, will become more apparent in the detailed description of a preferred embodiment presented below.

DESCRIPTION OF THE DRAWING

In a detailed description of a preferred embodiment of the invention presented below, reference is made to the accompanying drawing, in which.

DETAILED DESCRIPTION OF A PREFERRED EMBODIMENT

Because electronic strobe flash apparatus is well known, the present description will be directed in particular to elements forming part of, or cooperating more directly with, apparatus in accordance with the present invention. It is to be understood that strobe flash elements not specifically shown or described may take various forms well known to those having skill in the art.

Figure 1:
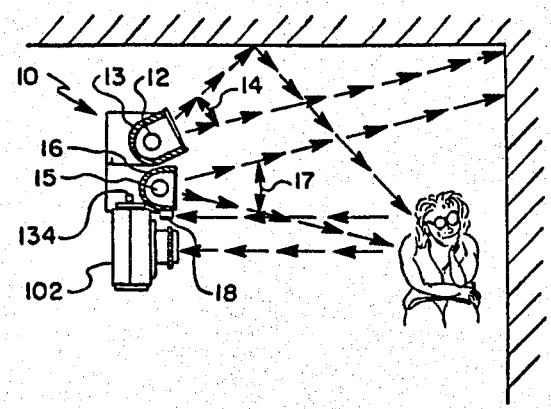
FIG. 1 is a somewhat schematic side elevational view of electronic strobe flash apparatus and a camera in which portions of two flash reflectors are removed for clarity of illustration.

FIG. 1 illustrates generally electronic strobe flash apparatus 10 according to the present invention. The apparatus 10 includes a flashtube 12 and a reflector 13, which are arranged to project a bounce flash light beam 14 upwardly so that upon reflection from a nearby overhead surface, a subject can be illuminated indirectly in a way characteristic of the natural lighting of the sun.

A flashtube 15 and a reflector 16 are arranged to project a light beam 17 directly at the subject. The light beam 17 provides fill-in to soften dark shadows, such as might occur under the subject's eyes or chin.

In accordance with the present invention, the indirect flash is produced first. When a predetermined amount of light has been reflected from the subject and has been received by a photosensor 18, the flashtube 12 is quenched and the flashtube 15 is energized to produce the direct flash. When the photosensor 18 has sensed a total predetermined amount of reflected illumination, including indirect plus direct, the flashtube 15 is quenched. Thus, a subject is illuminated with both indirect and direct flash and a predetermined ratio of indirect to direct flash is maintained.

The photosensor 18 senses light reflected from a scene that can, of course, include ambient light. Because the intensity of the ambient light is normally much lower than the electronic flash intensity, the ambient light would generally have relatively little influence in the control of the indirect flash and the direct flash.

However, the quantities of indirect and direct flash can be controlled precisely with or without ambient light by separating the photosensor's output current into 2 components, i.e., one due to ambient light and the other due to electronic flash. The photosensor component relating to the ambient light would be substantially DC, indicating the intensity of slowly changing ambient, and the photosensor component relating to the electronic flash would be AC, indicating the rapidly changing electronic flash. A bandpass filter can be employed to remove the DC component from the photosensor's output so that both the indirect and direct flash can be regulated independently of the ambient.

Figure 2:
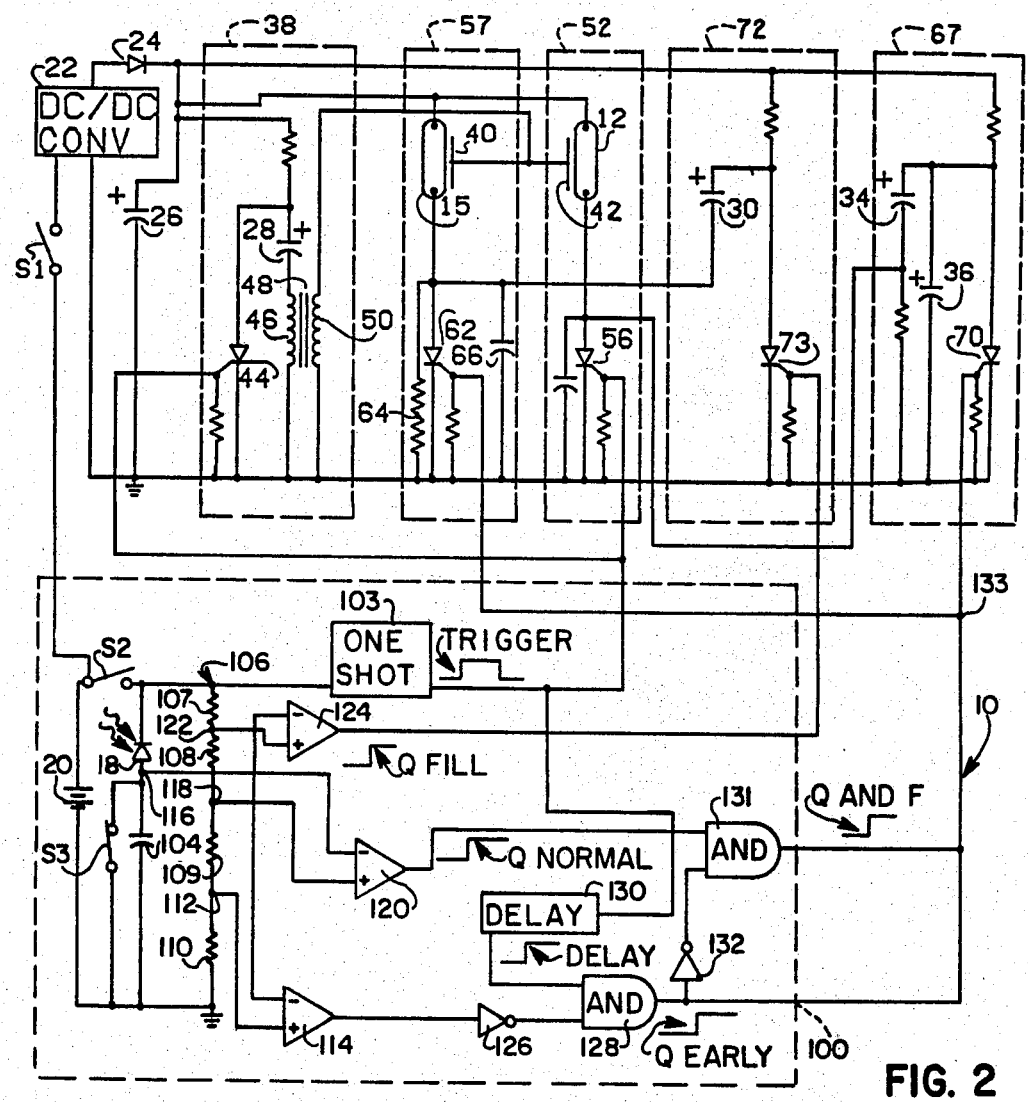
FIG. 2 is a schematic diagram of a circuit used in the flash apparatus of FIG. 1.

Referring now to FIG. 2, a battery 20 energizes a DC to DC converter 22 when a power switch $S_1$ is closed. By means well known in the electronic strobe flash art, the converter 22 produces a series of alternating voltage pulses. The positive pulses cause a diode 24 to conduct, and charge capacitors 26, 28, 30, 34 and 36 to approximately 350 volts with polarities as shown.

The capacitor 26 provides a discharge current to the flashtube 12 and the flashtube 15 for causing them to produce respective light pulses.

Circuitry 38, which includes capacitor 28, constitutes means for applying a voltage pulse to an electrode 40 of the flashtube 15 and an electrode 42 of the flashtube 12 for triggering the flashtubes into conduction. When a voltage pulse is applied to the gate electrode of an SCR 44, the capacitor 28 discharges through the SCR and a primary winding 46 of a trigger transformer 48. This discharge produces a high voltage pulse across a secondary winding 50 of the transformer 48 that triggers the flashtubes 12 and 15.

Circuitry 52 constitutes means for firing the flashtube 12 to produce the indirect flash. When the flashtube 12 and an SCR 56 conduct concurrently, the capacitor 26 discharges through the flashtube 12 and the SCR 56 to ground, thereby causing the flashtube to produce the indirect flash.

Circuitry 57 is arranged to fire the flashtube 15 to produce the direct flash after the indirect flash is produced. When the flashtube 15 and an SCR 62 conduct concurrently, a high discharge current flows from the capacitor 26 through the flashtube 15 and the SCR 62 to ground which causes the flashtube 15 to produce the direct flash.

The circuitry 38 triggers both flashtubes simultaneously. So that the flashtube 15 does not produce the direct flash when the indirect flash occurs, a resistor 64 is connected between the flashtube 15 and ground. The resistor 64 regulates the discharge current from the capacitor 26 through the flashtube 15 so that it is maintained in a conducting state, emitting only an imperceptible amount of light.

Also, so that the flashtube 15 does not produce the direct flash immediately after it is triggered, a snubber capacitor 66 is connected between the flashtube and ground, parallel to the SCR 62. When the flashtube 15 is triggered, a rapidly rising voltage can appear at the anode of the SCR 62 that can cause it to conduct and effectively short-circuit the resistor 64. The capacitor 66 reduces the rate of increase of this voltage so that the SCR 62 does not conduct in response to the triggering of the flashtube 15.

Circuitry 67 constitutes means for quenching the flashtube 12. When an SCR 70 is caused to conduct, the capacitor 34 discharges through the SCR 70 and the SCR 56 to turn the latter OFF rapidly. When the SCR 56 is turned OFF, the current through the flashtube 12 is terminated, thereby quenching the flashtube.

When the flashtube 12 is triggered, a rapidly rising voltage appears at the anode of the SCR 56. This voltage is conducted through the capacitor 34 and appears at the anode of the SCR 70. The capacitor 36 is a snubber capacitor and is arranged to reduce the rate of increase of the voltage across the SCR 70 so that it does not conduct in response to the triggering of the flashtube 12.

Circuitry 72 constitutes means for quenching the flashtube 15. When an SCR 73 is caused to conduct, the capacitor 30 discharges through the SCR 73 and the SCR 62, which turns the latter OFF rapidly. When the SCR 62 is turned OFF, the resistor 64 limits the current through the flashtube 15 to extinguish the direct flash. The snubber capacitor 66 of circuitry 57 prevents the SCR 73 from conducting solely in response to the triggering of the flashtube 15.

Circuitry 100, which includes the photosensor 18, constitutes means for sequentially firing the flashtube 12 for indirect flash, and the flashtube 15 for direct flash so that the ratio of indirect to direct flash reflected from the subject is constant in instances where the indirect flash is above a minimum acceptable level. The circuitry 100 is arranged preferably, so that the flashtube 12 is fired first to produce seventy-five percent of the flash illumination to be reflected from the subject, then the flashtube 15 is fired to produce the remaining twenty-five percent, the ratio of reflected indirect to reflected direct flash being 3 to 1.

It is preferred that the flashtube 12 is fired first so that in situations where no indirect flash occurs, such as when illuminating an outdoor scene, or where a negligible amount of indirect flash occurs, the flashtube 15 can provide whatever additional flash illumination is required to at least illuminate the subject sufficiently with the direct flash. More particularly, if the apparatus 10 is operated outdoors or in a room having either a high ceiling or a low-optically-reflective ceiling, or if the distance between the apparatus 10 and the subject is large, the electrical energy supplied by the capacitor 26 to the flashtube 12 is neither wasted entirely nor is an excessive amount of energy consumed to produce the required indirect flash.

Circuitry 100 includes a low-light switch for preventing excessive energy consumption by the flashtube 12 in those situations where it is impossible or difficult to produce the desired indirect flash. If the photosensor 18 has not sensed a minimum acceptable amount of light during a predetermined interval, preferably 40 microseconds (us) after the flashtube 12 has been triggered, it is assumed that the desired amount of indirect flash will not occur. Accordingly, the low-light switch quenches the flashtube 12, so that the energy remaining on the capacitor 26 can be used to fire the flashtube 15. On the other hand, if, during the 40 us interval, the photosensor 18 has sensed more light than the minimum acceptable amount, the circuitry 100 provides for continuing the firing of the flashtube 12 until the desired amount of indirect flash has been sensed.

A switch $S_2$ is arranged to close and a switch $S_3$ is arranged to open, preferably simultaneously, in response to opening a shutter (not shown) of a camera 102, shown in FIG. 1, with which the strobe flash apparatus 10 is used. When the switch $S_2$ is closed, the photosensor 18 is energized, and a one-shot multivibrator 103 produces a voltage pulse "TRIGGER," the duration of which is at least 40 us.

When the photosensor 18 is energized, it produces a current that is proportional to the intensity of the illumination impinging upon it. When the switch $S_3$ is opened, the photosensor's current charges a timing capacitor 104 at a rate proportional to the magnitude of the current. Accordingly, the photosensor 18 and the capacitor 104 constitute a light-sensitive integrating circuit where the voltage across the capacitor 104 corresponds to the time integral of the light sensed by the photosensor 18 after the switches $S_2$ and $S_3$ are actuated.

A voltage divider circuit 106, which consists of serially connected resistors 107, 108, 109 and 110, is connected parallel to the photosensor 18 and the capacitor 104, as shown. A terminal 112 between the resistor 110 and the resistor 109 is connected to the non-inverting input terminal of a voltage comparator circuit 114, and a terminal 116 between the photosensor 18 and the capacitor 104 is connected to the inverting input terminal of the comparator 114.

The voltage divider 106 provides a reference voltage at the terminal 112 corresponding to the aforementioned minimum acceptable amount of light. The voltage divider 106 and the light-sensitive integrating circuit are arranged with respect to each other so that the voltage at the terminal 112 is greater than the voltage at the terminal 116 when photosensor 18 has sensed an amount of light which is less than the minimum acceptable amount of light, and the voltage at the terminal 116 is greater than the voltage at the terminal 112 when the photosensor 18 has sensed light which is greater than the minimum acceptable amount.

A terminal 118 between the resistor 109 and the resistor 108 is connected to the non-inverting input terminal of a voltage comparator circuit 120, and the terminal 116 is connected to the inverting input terminal of the comparator 120.

The voltage divider 106 provides a reference voltage at the terminal 118 corresponding to a desired predetermined amount of reflected indirect flash. Accordingly, the voltage divider 106 and the light-sensitive integrating circuit are arranged with respect to each other so that the voltage at the terminal 118 is greater than the voltage at the terminal 116 when the photosensor 18 has sensed an amount of light which is less than the desired amount of reflected indirect flash, and the voltage at the terminal 116 is greater than the voltage at the terminal 118 when the photosensor 18 has sensed light which is greater than the desired amount of indirect flash.

A terminal 122 between the resistor 108 and the resistor 107 is connected to the non-inverting input terminal of a voltage comparator circuit 124, and the terminal 116 is connected to the inverting input terminal of the comparator 124.

The voltage divider 106 provides a reference voltage at the terminal 122 corresponding to a desired total amount of reflected scene illumination, including indirect plus direct flash. For a 3 to 1 ratio between the reflected indirect and the reflected direct flash the voltage at the terminal 118 would be three fourths the voltage at the terminal 122.

The voltage divider 106 and the integrating circuit are arranged with respect to each other so that the voltage at the terminal 122 is greater than the voltage at the terminal 116 when the photosensor 18 has sensed an amount of light which is less than the desired total amount of reflected light, and the voltage at the terminal 116 is greater than the voltage at the terminal 122 when the photosensor has sensed an amount of light which is greater than the desired total amount.

The comparator 114 is arranged to produce a logic 0 level voltage at its output terminal when the photosensor 18 senses an amount of light that is less than the minimum acceptable level, and to produce a logic 1 level voltage when the photosensor senses either an amount of light that equals or is greater than the minimum acceptable level.

The output terminal of the comparator 114 is connected to the input terminal of an inverter 126. The inverter's output terminal is connected to one input terminal of a conventional dual-input AND gate 128, which constitutes a low-light switch.

The other input terminal of the AND gate 128 is connected to an output terminal of a time-delay circuit 130. The time-delay circuit 130 is arranged to produce a logic 1 level voltage "DELAY" 40 us after the occurrence of the leading edge of the pulse "TRIGGER."

The time-delay circuit 130 and the combination of the comparator 114 and the inverter 126 are arranged with respect to the AND gate 128 so that logic 1 level voltages appear concurrently at both input terminals of the AND gate 128 only if, during the 40 us interval immediately following the occurrence of the leading edge of the pulse "TRIGGER", photosensor 18 has sensed an amount of light that is less than the minimum acceptable level of reflected light. When logic 1 level voltages appear concurrently at both input terminals, the AND gate 128 produces a logic 1 level voltage "Q EARLY," which indicates that an inadequate amount of indirect flash has been sensed during the initial 40 us interval.

The comparator 120 is arranged to produce a logic 0 level voltage at its output terminal when the photosensor 18 has sensed an amount of light that is less than the desired amount of indirect flash, and to produce a logic 1 level voltage "Q NORMAL" when the photosensor has sensed either an amount of light that equals or is greater than such desired amount.

The output terminal of the comparator 120 is connected to an input terminal of a conventional dual-input AND gate 131. The other input terminal of the AND gate 131 is connected to the output terminal of an inverter 132, the input terminal of which is connected to the output terminal of the AND gate 128. The comparator 120 and the AND gate 128 and the inverter 132 are arranged with respect to the AND gate 131 so that logic 1 level voltages appear concurrently at both input terminals of the AND gate 131 when the photosensor 18 has sensed an amount of light that equals the desired amount of reflected indirect flash only if, during the initial 40 us interval, the photosensor has first sensed more light than the minimum acceptable amount. When logic 1 level voltages appear concurrently at both input terminals, the AND gate 131 produces a logic 1 level voltage "Q AND F," which indicates that the desired amount of reflected indirect flash has been sensed.

The output terminal of the AND gate 128 and the output terminal of the AND gate 131 are connected to a terminal 133, which is connected to the gate of the SCR 62 and the gate of the SCR 70. Accordingly, either the voltage "Q AND F" or the voltage "Q EARLY" switches the SCR 62 and the SCR 70 into conduction.

The comparator 124 is arranged to produce a logic 0 level voltage when the photosensor 18 has sensed an amount of light that is less than the desired predetermined total amount, and to produce a logic 1 level voltage "Q FILL" when the photosensor has sensed either an amount of light that equals or is greater than the predetermined total amount. The output terminal of the comparator 124 is connected to the gate of the SCR 73 so that the voltage "Q FILL" switches the SCR 73 into conduction.

In describing the operation of the electronic strobe flash apparatus 10, it is assumed that the switch $S_1$ is closed, for example, by an operator of the camera 102, and the DC to DC converter 22 has charged the capacitors 26, 28, 30, 34, and 36. When a camera release button 134 (FIG. 1) is actuated, the camera shutter opens, thereby causing the switch $S_2$ to close and the switch $S_3$ to open.

When the switch $S_2$ is closed, the battery 20 energizes the circuitry 100, and the one-shot multivibrator 103 immediately produces the pulse "TRIGGER." When the switch $S_3$ opens, the capacitor 104 commences to charge in response to the current through the photosensor 18.

The gate of the SCR 44 and the gate of the SCR 56 receive the pulse "TRIGGER," thereby switching both SCR's into conduction simultaneously. In response to the conduction of the SCR 44, the capacitor 28 discharges through the SCR and the primary winding 46 of the trigger transformer 48, which triggers the flashtube 15 and the flashtube 12.

In response to the triggering of the flashtubes, the capacitor 26 commences to discharge through both flashtubes. As the SCR 56 is conducting, the impedance from the flashtube 12 to ground is relatively small. A large discharge current flows from the capacitor 26 through the flashtube 12 to produce a light pulse which can be reflected from a nearby overhead surface to form the indirect flash. On the other hand, the SCR 62 is in a non-conductive state so the discharge current through the flashtube 15 is limited by the resistor 64. Accordingly, the flashtube 15 produces initially only an imperceptible amount of light.

As long as sensor 18 has sensed an amount of light which is less than the aforementioned minimum acceptable amount, the comparator 114 produces a logic 0 level voltage, and the inverter 126 produces a logic 1 level voltage.

The time-delay circuit 130 produces the logic 1 level voltage "DELAY" 40 us after the flashtube 12 has been triggered to produce the indirect flash. Accordingly, 40 us after the flashtube 12 is triggered, if the photosensor 18 has sensed an amount of light which is less than the minimum acceptable amount, the AND gate 128 produces the voltage "Q EARLY".

In response to the voltage "Q EARLY," both the SCR 62 and the SCR 70 conduct. When the SCR 70 conducts, the capacitor 34 discharges rapidly through the SCR 70 and the SCR 56, to turn the SCR 56 OFF thereby quenching the flashtube 12. Accordingly, the flashtube 12 is quenched only 40 us after it is fired if an insufficient amount of indirect flash has been produced during this time.

When the SCR 62 conducts, the resistor 64 is effectively short-circuited, thereby decreasing the impedance between the flashtube 15 and ground. Therefore, the current through the flashtube 15 increases significantly, which causes the flashtube 15 to emit a high intensity light pulse for direct flash.

On the other hand, if, during the 40 us interval after the flashtube 12 is triggered, the photosensor 18 senses an amount of light which equals the minimum acceptable level, then the inverter 126 produces a logic 0 level voltage. In this case, at the termination of the 40 us interval, the AND gate 128 produces a logic 0 level voltage at its output terminal. Accordingly, flashtube 12 is not quenched and the flashtube 15 is not fired.

When the voltage "Q EARLY" has not been produced, the inverter 132 produces a logic 1 level voltage at its respective input terminal of the AND gate 131. Once the photosensor 18 has sensed an amount of reflected scene illumination that equals the desired amount of reflected indirect flash, the comparator 120 produces the voltage "Q NORMAL." In this case, in response to the voltages "Q NORMAL" and the logic 1 level voltage produced by the inverter 132, the AND gate 131 produces the voltage "Q and F". When the voltage "Q and F" is produced, the SCR 70 and the SCR 62 conduct, thereby causing the flashtube 12 to be quenched to extinguish the indirect flash, and the flashtube 15 to be fired to produce the direct flash, respectively.

Because the direct flash is produced when the indirect flash is extinguished, the photosensor 18 senses only the indirect flash or the direct flash at any one time. When the photosensor 18 has sensed a total desired amount of reflected scene illumination, the capacitor 104 is charged to a voltage, which causes the comparator 124 to produce the voltage "Q FILL".

In response to the voltage "Q FILL," the SCR 73 conducts, thereby causing the capacitor 30 to discharge to turn the SCR 62 OFF. When the SCR 62 turns OFF, the current through the flashtube 15 is limited by the resistor 64, and the direct flash is thereby extinguished.

The invention has been described in detail with reference to the Figures, however, it will be appreciated that variations and modifications are possible within the spirit and scope of the invention. For example, it can readily be understood by those skilled in the art that any predetermined ratio of indirect to direct flash can be achieved by varying the relative values of the resistors of the voltage divider circuit 106. Furthermore, the delay circuit 130 can be arranged to change the interval used to determine the adequacy of the reflected indirect flash. In particular, for an outdoor flash exposure, an adjustable member could be provided, preferably, accessible to a camera operator, to reduce the delay to zero so that substantially all the flashtube firing energy can be delivered to the flashtube 15 for illuminating a subject solely with direct flash.

What is claimed is:

1. In electronic strobe flash apparatus having a first energizable flashtube arranged to project light in a first direction to illuminate a scene indirectly, and a second energizable flashtube arranged to project light in a second direction to illuminate the scene directly, the improvement comprising.
    (a) means for energizing one of said flashtubes to illuminate the scene; and
    (b) light regulating means for de-energizing said energized flashtube and energizing the other of said flashtubes to illuminate the scene with light produced by only one of said flashtubes at any one time.

2. In electronic strobe flash apparatus having first actuatable means for projecting light in a first direction to illuminate a scene indirectly, and second actuatable means for projecting light in a second direction to illuminate the scene directly, the improvement comprising:
    (a) photosensitive means for producing a light regulating signal corresponding to the time integral of light reflected from the scene;
    (b) means for actuating one of said light projecting means to illuminate the scene; and (c) light regulating means, coupled to said photosensitive means, for actuating the other of said light projecting means after the light regulating signal indicates that a predetermined cumulative amount of light has been reflected from the scene.

3. In electronic strobe flash apparatus having a first energizable flashtube arranged to project light in a first direction to illuminate a scene indirectly, and a second energizable flashtube arranged to project light in a second direction to illuminate the scene directly, the improvement comprising:
  (a) photosensitive means for producing a light regulating signal corresponding to the time integral of light reflected from the scene;
  (b) means for energizing one of said flashtubes to illuminate the scene; and
  (c) light regulating means, coupled to said photosensitive means, for energizing the other of said flashtubes after the light regulating signal indicates that a predetermined cumulative amount of illumination has been reflected from the scene.

4. In electronic strobe flash apparatus having a first energizable flashtube arranged to project light in a first direction to illuminate a scene indirectly, and a second energizable flashtube arranged to project light in a second direction to illuminate the scene directly, the improvement comprising:
  (a) photosensitive means for producing a light regulating signal corresponding to the time integral of light reflected from the scene;
  (b) means for energizing said first flashtube to illuminate the scene; and
  (c) light regulating means, coupled to said photosensitive means, for energizing said second flashtube after the light regulating signal indicates that a predetermined cumulative amount of illumination has been reflected from the scene.

5. In electronic strobe flash apparatus having a first energizable flashtube arranged to project light in a first direction to illuminate a scene indirectly, and a second energizable flashtube arranged to project light in a second direction to illuminate the scene directly, the improvement comprising:
  (a) photosensitive means for sensing light reflected from the scene;
  (b) means for energizing said first flashtube to illuminate the scene;
  (c) light regulating means, coupled to said photosensitive means, for energizing said second flashtube after said photosensitive means senses that a predetermined amount of illumination has been reflected from the scene; and
  (d) low-light switching means for de-energizing said first flashtube and energizing said second flashtube before said photosensitive means has sensed the predetermined amount of reflected scene illumination.

6. In electronic strobe flash apparatus having a first energizable flashtube arranged to project light in a first direction for reflection from a surface to illuminate a scene indirectly, and a second energizable flashtube arranged to project light in a second direction to illuminate the scene directly, the improvement comprising:
  (a) photosensitive means for sensing light reflected from the scene;
  (b) means for energizing one of said flashtubes to illuminate the scene; and
  (c) light regulating means, responsive to said photosensitive means sensing that a predetermined amount of illumination has been reflected from the scene, for de-energizing said energized flashtube and energizing the other of said flashtubes.

7. In electronic strobe flash apparatus having a first energizable flashtube arranged to project light in a first direction for reflection from a surface to illuminate a scene indirectly, and a second energizable flashtube arranged to project light in a second direction to illuminate the scene directly, the improvement comprising:
  (a) photosensitive means for sensing light reflected from the scene;
  (b) means for energizing said first flashtube to illuminate the scene; and
  (c) light regulating means, coupled to said photosensitive means, for de-energizing said first flashtube and energizing said second flashtube when said photosensitive means senses that a first predetermined amount of illumination has been reflected from the scene, and for de-energizing said second flashtube when said photosensitive means senses that a second predetermined amount of illumination has been reflected from the scene, whereby said first and second flashtubes are controlled so that a predetermined ratio of indirect to direct illumination reflected from the scene occurs.

8. In electronic strobe flash apparatus having a first energizable flashtube arranged to project a light pulse in a first direction for reflection from a surface to illuminate a scene indirectly, and a second energizable flashtube arranged to project a light pulse in a second direction to illuminate the scene directly, the improvement comprising:
  (a) photosensitive means for sensing light reflected from the scene;
  (b) means for energizing said first flashtube to illuminate the scene;
  (c) light regulating means, coupled to said photosensitive means, for de-energizing said first flashtube and energizing said second flashtube either when (1) said photosensitive means senses that a first predetermined amount of illumination has been reflected from the scene, or (2) said photosensitive means has sensed during a particular interval an amount of reflected scene illumination that is less than a given fraction of the first predetermined amount, and for de-energizing said second flashtube when said photosensitive means senses that a second predetermined amount of illumination has been reflected from the scene.

9. In electronic strobe flash apparatus having a first flashtube arranged to project a light pulse in a first direction for reflection from a surface to illuminate a scene indirectly, a second flashtube arranged to project a light pulse in a second direction to illuminate the scene directly, and first and second energizable circuits for firing said first and second flashtubes to cause them to produce respective light pulses, the improvement comprising:
  (a) photosensitive means for sensing light reflected from the scene;
  (b) means for energizing said first circuit to cause said first flashtube to illuminate the scene;
  (c) level-sensing switching means, coupled to said photosensitive means, having (1) a first condition, occurring in response to said photosensitive means sensing that a first predetermined amount of light has been reflected from the scene, for de-energizing said first circuit and energizing said second circuit substantially simultaneously, whereby the light from said first flashtube is extinguished substantially concurrently with the commencement of light from said second flashtube, and (2) a second condition, occurring in response to said photo-sensitive means sensing that a second predetermined amount of light has been reflected from the scene, for de-energizing said second circuit, whereby said first and second flashtubes are controlled so that a predetermined ratio of indirect to direct illumination reflected from the scene occurs.

10. In electronic strobe flash apparatus having a first flashtube arranged to project a light pulse in a first direction for reflection from a surface to illuminate a scene indirectly, a second flashtube arranged to project a light pulse in a second direction to illuminate the scene directly, and first and second energizable circuits for firing said first and second flashtubes, respectively, to cause them to produce respective light pulses, the improvement comprising:
(a) photosensitive means arranged for sensing light reflected from the scene;
(b) first and second quench circuits energizable for extinguishing the light from said first and second flashtubes, respectively;
(c) means for energizing said first flashtube to illuminate the scene;
(d) first switching means, responsive to said photosensitive means sensing that a first predetermined amount of illumination has been reflected from the scene, for energizing said first quench circuit and said second firing circuit substantially concurrently, whereby the light from said first flashtube is extinguished in synchronism with the occurrence of light from said second flashtube; and
(e) second switching means, responsive to said photosensitive means sensing that a second predetermined amount of illumination has been reflected from the scene, for energizing said second quench circuit to extinguish the light from said second flashtube, whereby a predetermined ratio of reflected indirect scene illumination to reflected direct scene illumination is maintained.

11. In electronic strobe flash apparatus having a first flashtube arranged to project a light pulse in a first direction for reflection from a surface to illuminate a scene indirectly, a second flashtube arranged to project a light pulse in a second direction to illuminate the scene directly, and first and second energizable firing circuits for causing said first and second flashtubes to produce respective light pulses, the improvement comprising:
(a) photosensitive means, arranged to receive light reflected from the scene, for producing a control signal that corresponds to the time integral of reflected scene light;
(b) a first quench circuit, coupled to said first firing circuit, energizable for extinguishing light from said first flashtube;
(c) a second quench circuit, coupled to said second firing circuit, energizable for extinguishing light from said second flashtube;
(d) triggering means for energizing said first firing circuit to cause said first flashtube to illuminate the scene;
(e) first switching means, coupled between said photosensitive means and said first quench and second firing circuits, having (1) a normal first condition when the control signal indicates that the time integral of the reflected scene light is less than a first predetermined level, and (2) a second condition when the control signal indicates that the time integral of the reflected scene light is greater than said first predetermined level for energizing synchronously (i) said first quench circuit to extinguish the light from said first flashtube, and (ii) said second firing circuit to produce light from said second flashtube; and
(f) second switching means, coupled between said photosensitive means and said second quench circuit, having (1) a normal first condition when the control signal indicates that the reflected scene light is less than a second predetermined level, and (2) a second condition when the control signal indicates that the time integral of the reflected scene light is greater than said second predetermined level for energizing said second quench circuit to extinguish the light from said second flashtube, whereby said first and second flashtubes are controlled so that a predetermined ratio of indirect to direct illumination reflected from the scene occurs.

12. In electronic strobe flash apparatus having first energizable means for projecting light in a first direction to illuminate a scene indirectly, and second energizable means for projecting light in a second direction to illuminate the scene directly, the improvement comprising:
(a) photosensitive means for sensing light reflected from the scene;
(b) means for energizing one of said light projecting means to illuminate the scene; and
(c) light regulating means, coupled to said photosensitive means, for de-energizing the last-mentioned of said light projecting means and energizing the other of said light projecting means when said photosensitive means senses that a predetermined amount of light has been reflected from the scene, whereby said photosensitive means responds to light produced by only one of said light projecting means at any one time.

13. In electronic strobe flash apparatus having a first energizable flashtube arranged to illuminate a scene from a first angle, and a second energizable flashtube arranged to illuminate the scene from a second angle, the improvement comprising:
(a) photosensitive means for producing an exposure control signal in response to light reflected from the scene;
(b) means, coupling said photosensitive means and said first and second flashtubes, for regulating the illumination produced, respectively, by said first and second flashtubes as a function of the exposure control signal; and
(c) sequencing means, coupling said illumination regulating means and said first and second flashtubes, for energizing and deenergizing said first flashtube and for energizing and deenergizing said second flashtube after said first flashtube is effectively deenergized so that illumination from either flashtube does not affect the regulating of the light from the other flashtube.

14. In electronic strobe flash apparatus having a first energizable flashtube arranged to illuminate a scene from a first angle, and a second energizable flashtube arranged to illuminate the scene from a second angle, the improvement comprising:

(a) photosensitive means for producing an exposure control signal in response to light reflected from the scene;

(b) first and second means, responsive to the exposure control signal, for regulating, respectively, the illumination produced by said first and second flashtubes; and (c) sequencing means, coupling said first and second illumination regulating means to said first and second flashtubes, respectively, for energizing and deenergizing said first flashtube and for energizing said second flashtube after said first flashtube is deenergized so that the illumination produced by said first flashtube is noncontemporaneous with the illumination produced by said second flashtube.

15. In electronic strobe flash apparatus having flashtube means for providing scene illumination from a first angle and a second angle, and light sensing means responsive to scene illumination, the improvement comprising:

(a) sequencing means for firing said flashtube means to sequentially and noncontemporaneously illuminate the scene from the first angle and then from the second angle; and (b) control means, coupling said light sensing means and said flashtube means, for regulating illumination from said flashtube means as a function of the response of said light sensing means to illumination of the scene from the first and second angles.

* * * * *